United States Patent [19]
Talbot

[11] 4,350,783
[45] Sep. 21, 1982

[54] MINE BOLT COMPOSITION

[75] Inventor: Dean W. Talbot, Coshocton, Ohio

[73] Assignee: General Electric Company, Schenectady, N.Y.

[21] Appl. No.: 254,786

[22] Filed: Apr. 16, 1981

[51] Int. Cl.$^3$ ............................................. C08L 67/06
[52] U.S. Cl. .................................. 523/505; 206/219; 524/906
[58] Field of Search ................ 260/29.2 UA, 40 R; 206/219; 521/97; 523/505

[56] References Cited
U.S. PATENT DOCUMENTS

| | | | |
|---|---|---|---|
| 3,731,791 | 5/1973 | Fourcade et al. | 206/219 |
| 4,009,778 | 3/1977 | Howell | 206/219 |
| 4,227,612 | 10/1980 | Dillon | 206/219 |
| 4,260,699 | 4/1981 | Plaisted | 206/219 |
| 4,273,689 | 6/1981 | Smearing | 206/219 |
| 4,280,943 | 7/1981 | Bivens et al. | 260/29.2 UA |

*Primary Examiner*—Lewis T. Jacobs
*Attorney, Agent, or Firm*—Hedman, Casella, Gibson & Costigan

[57] ABSTRACT

A composition and its use in an encapsulated system comprising a resin composition, calcium carbonate, relatively weak acid, water and carbon dioxide generated in situ so as to prolong the maintenance of rigidity of the pressure-filled capsule.

10 Claims, No Drawings

MINE BOLT COMPOSITION

This invention relates to an improvement in a composition and its use in an encapsulated sealing system by the generation of carbon dioxide in situ, so as to maintain an acceptable internal pressure and thereby extend the shelf life of the system, with particular application in mining roof bolting systems.

Resin systems are well known in the art of mining roof bolting systems, which are used to reinforce and stabilize mine roofs. It is common practice to drill or bore a hole in the rock strata at the roof of the mine and insert first an encapsuled resin system and then insert a specially designed bolt through the capsule. In the typical mining roof bolting system capsule, a curable resin component composed of epoxies, polyurethanes or polyesters, and the like, is separated from a catalyst, or hardener, component. Rupture of the capsule by introduction of the bolt into the hole and turning of the bolt distributes and mixes the resin and the hardening agent, or catalyst. The resin then cures and hardens around the bolt and thereby strengthens and reinforces the mine roof.

Difficulties with such encapsulated systems have been encountered, however. For instance, difficulties are encountered in attaining an acceptable seal of the plastic film which is used to make the resin-catalyst capsule. Further, such a film, though sufficiently impervious to vapor transmission so as to maintain the freshness of the resin, does however allow a certain amount of leakage of vapor out of the capsule after extended periods of time. Moreover, most such films also tend to stretch over a period of time. Although typical capsules are rigid initially, having been filled to capacity under pressure and contained by a closure means, they do thereafter begin continuously to lose weight by vapor loss and also to stretch over time. After numerous trials, as yet no ideal plastic film packaging material has been found which is both reasonable in cost and capable of being heat-sealed. Rigidity is important because a self-supporting capsule must be rammed upwardly into a hole drilled in the mine roof. It is a primary purpose of this invention to provide an encapsulated mining roof bolting system using prior art plastic films and yet maintain rigidity, or stiffness, over a long period of time.

For optimal stiffness of the capsule, it has been determined that a minimum internal pressure within the resin system capsule of six pounds per square inch is required. In the instant invention, it was discovered that such internal pressure can be generated over an extended period of time and thereby maintain almost an equilibrium pressure state. This adds significantly to the shelf life of the mining roof bolting package systems and is accomplished by the addition of a relatively weak acid constituent which reacts with the calcium carbonate filler in the resin system to form carbon dioxide in situ.

It has been discovered that such reaction between the calcium carbonate filler which is conventional in the resin component and an acid constituent which is not present conventionally will produce sufficient gaseous carbon dioxide to generate the desired internal pressure. Specifically, it has been discovered that the introduction of relatively weak acids, such as phthalic acid and the like, into the resin system—which also must contain added water—guarantees a proper and acceptable rate of reaction and generation of carbon dioxide in situ to accomplish the objective of maintaining sufficient internal pressure within the resin system capsule over an extended period of time to enable the capsule to maintain its stiffness or rigidity.

DESCRIPTION OF THE INVENTION

According to the present invention, in its broadest aspects, there are provided resin compositions comprising:

(a) an unsaturated polyester resin composition;
(b) a major portion of calcium carbonate;
(c) an effective carbon dioxide generating amount of relatively weak acid which is capable of reacting with calcium carbonate in the presence of water to generate carbon dioxide, and
(d) a small, effective amount of water.

Also contemplated by the present invention are encapsulated mining roof bolting systems containing in one compartment a resin composition as described above and in a second compartment an organic hardener or catalyst which is reactive with said resin composition.

Component (a), the liquid curable resin, is readily made and available commercially. One method is exemplified in detail hereinafter. While there are a number of resin compounds which are useful in mining roof bolting systems, so-called unsaturated polyester resins are commonly used. These are prepared by esterification of a mixture of ingredients including a polyhydric alcohol and an unsaturated polycarboxylic acid wherein the polycarboxylic acid is reacted into the unsaturated polyester resin almost completely, resulting in a product with a low acid number. This mixture is combined as desired with cross-linking monomers typified by vinyl monomers, such as styrene and vinyl toluene, along with flow modifiers, thixotropic agents, flame retardant materials, plasticizers, initiators or curing agents, usually of the peroxide type, and various fillers. One filler in the resin component commonly used and essential to practice this invention is calcium carbonate.

Component (b), the calcium carbonate filler, can comprise, e.g., a ground form of limestone or it can be in precipitated form; both are crystalline, the latter being somewhat less dense and of much smaller particle size. Suitable commercial forms of ground calcium carbonate are available from Pfizer, Inc. under the trademark VICRON, and a suitable form of precipitated calcium carbonate is sold by Pfizer, Inc. under the trademark ALBAGLOS.

Component (b) preferably comprises from about 100 to about 400 parts by weight per 100 parts by weight of (a), (c) and (d). More preferably from about 100 to about 300 parts.

Component (c) can comprise a relatively weak acid which varies widely in that type and amount. Generally it will be a mono or poly-carboxylic acid of from about 2 to about 30 carbon atoms. A relatively weak organic acid can be aliphatic, aromatic or aliphatic/aromatic. It need only be capable of generating carbon dioxide by reaction with calcium carbonate in the presence of water. Suitable such acids are, for example, acetic acid, propionic acid, benzoic acid, phenylacetic acid, phthalic acid, and the like, the latter being preferred.

The addition of such an acid, component (c), and component (d), water, will generate carbon dioxide in situ and thereby increase and maintain an acceptable internal pressure within the capsule.

In preferred embodiments, the concentration of the acid is between about 0.1 to about 1.0 parts by weight and the concentration of water is not substantially greater than about 1 part by weight per 100 parts by weight of the total composition.

The other component of the two-part resin system is a conventional catalyst, or hardener paste, an example of which is benzoyl peroxide and those described in U.S. Pat. No. 3,731,791. Such a catalyst paste is typically comprised of a diacyl peroxide, a plasticizing amount of a vinyl-reactive di(hydroxyloweroxyalkyl) fumarate plasticizer, and a finely divided mineral filler such as calcium carbonate, which prevents separation of the paste into its components during storage.

The packaging of this two-part system may provide for a dual-compartment capsule, such as that shown and described in U.S. Pat. No. 4,009,778, or U.S. Pat. No. 4,227,612, or for a single-compartment capsule, such as those shown and described in U.S. Pat. No. 3,731,791.

The resin and catalyst components may be packaged in a polyester film, as is typically done in this art. A polyethylene terephthalate film, or Mylar, has been found to be acceptable because it is inert to both the resin and catalyst.

DESCRIPTION OF THE PREFERRED EMBODIMENT

The following examples illustrate the present invention. They are not to be construed to limit the claims in any manner whatsoever.

EXAMPLE 1

The composition of the resin is as follows:

| Part | Materials | % by Weight |
|---|---|---|
| I | Triphenyl Phosphite | 0.100 |
| | Propylene Glycol | 13.414 |
| | Diethylene Glycol | 18.710 |
| | Phthalic Anhydride | 17.415 |
| | Maleic Anhydride | 21.416 |
| II | Toluene | — |
| III | 1,4-Naphthoquinone | 0.073 |
| IV | Vinyl Toluene | 13.000 |
| V | Styrene | 13.000 |
| VI | For Adjustment | |
| | Vinyl Toluene | 0.908 |
| | Styrene | 0.908 |
| VII | Variquat B-200 | 0.153 |
| | Copper Naphthenate, 8% | 0.027 |
| | Dimethyl Paratoluidine | 0.874 |
| | | 99.998 |

Equipment is set for a total reflux through a column condenser and back to a kettle. A nitrogen blow into the kettle is started at 50 CFH. A kettle agitator is also started. Part I of the resin is loaded into a clean dry kettle. Part II (toluene) is loaded into a decanter and the excess is allowed to flow into the kettle. The batch temperature is allowed to climb to 135°–145° C. where the reflux will begin. The nitrogen blow is then stopped and the heat to the batch is regulated so that the batch refluxes gently for one hour. The batch temperature is then raised to 200° C. using a 20° C. dowtherm lead. The Refractive Index of the water phase in the decanter should be approximately 1.333. When the acid number of the mix-off solution comprising 70 parts resin from the kettle, 15 parts styrene and 15 parts vinyl toluene is 15–16, the batch should be blown. When the viscosity specification of the mix off solution is X ½ – Y, the batch is allowed to cool to 120° C.

Part III of the resin is added to the batch and allowed to blend for at least 20 minutes. Part IV (vinyl toluene) is added to the batch in the kettle and blended for 30 minutes. Part V (styrene) is added and blended for one hour while cooling. Adjust with Part VI as necessary. The resin is then cooled to 40° C. Part VII is added and blended for 30 minutes. The resin is then drawn off into unlined containers.

To the resin, 24.85 parts, is added black tint paste, 0.361 parts, then 0.002 parts of dimethyl p-toluidine and 0.262 parts of fumed colloidal silica (Cab-O-Sil). Then is added, with mixing, 9.155 parts of calcium carbonate (Albaglos), 13.079 parts of calcium carbonate (Vicron 41-8) and 52.315 parts of calcium carbonate (Marblewhite-200). The batch is then mixed until uniform. To the composition then is added 1 part of phthalic acid and 1 part of water to produce a composition according to this invention. The fact that it generates gas in situ is confirmed by confining a portion in a pipe fitting vessel made of one plug, one coupling, one or two bushings and a pressure gauge. The composition without added phthalic acid or water causes no pressure to be generated. The addition of phthalic acid alone and the addition of water alone also causes no pressure to be generated. When both water and phthalic acid are present, pressure is generated because carbon dioxide is liberated by decomposition of the calcium carbonate.

The time/pressure data obtained are as follows:

| Time (hrs.) | Pressure (psi) |
|---|---|
| 1 | 2+ |
| 18 | 4.0 |
| 42 | 4.5 |
| 30 | 5.0 |
| 114 | 7.7 |

EXAMPLE 2

A dual compartment package made of a continuous web of polyester film, Mylar, is prepared following the procedure and using the apparatus described in detail in Howell, U.S. Pat. No. 4,009,778, and especially FIGS. 4, 7 and 8. The Howell patent is incorporated herein by reference. The generally tubular member has a first compartment which is filled with the resin composition of Example 1 and assumes a generally circular cross section, and there is a second compartment formed inside the first compartment, and this includes a benzoyl peroxide paste composition which acts as an organic hardener for said resin composition.

If both water and phthalic acid are absent from the composition in the first compartment, over a period of time the initially rigid, filled package loses its rigidity because of vapor loss through the film to the outside and because the film stretches. On the other hand, when both phthalic acid and water are present in the stated amounts, carbon dioxide is liberated and the internal pressure generated over an extended period of time maintains stiffness.

All of the foregoing patents and/or publications are incorporated herein by reference. It is obvious that many variations are possible in light of the above detailed descriptions. For example, other unsaturated polyester resin compositions may be used. All such variations are within the full intended scope of the appended claims.

What is claimed is:

1. A resin composition adapted to maintain the rigidity of an encapsulated system, said composition comprising:
   (a) an unsaturated polyester resin composition;
   (b) from about 100 to about 400 parts by weight per 100 parts by weight of (a), (c) and (d) of calcium carbonate;
   (c) from about 0.1 to about 1.0 part by weight per 100 parts by weight of the total composition of a relatively weak acid which is capable of reacting with calcium carbonate in the presence of water to generate carbon dioxide; and
   (d) about 1 part by weight per 100 parts by weight of the total composition of water.

2. A composition as defined in claim 1, wherein calcium carbonate, component (b), comprises from about 100 to about 300 parts by weight per 100 parts by weight of components (a), (c) and (d).

3. A composition as defined in claim 1, wherein the concentration of the acid, component (c), is between about 0.1 and about 1.0 parts by weight and the concentration of water (d) is not substantially greater than about 1 part by weight per 100 parts by weight of the total composition.

4. A composition as defined in claim 1 wherein the relatively weak acid is an organic acid.

5. A composition as defined in claim 1 wherein the relatively weak acid is phthalic acid.

6. An encapsulated multicompartment system for mine roof bolting containing in one compartment a resin composition as defined in claim 1 and sufficient carbon dioxide generated in situ to provide internal rigidity in the compartment, and containing in a second compartment an organic hardener or catalyst reactive with said resin composition.

7. An encapsulated multicompartment system as defined in claim 6 wherein the calcium carbonate, component (b) of the resin composition, comprises from about 100 to about 300 parts by weight per 100 parts by weight of components (a), (c) and (d).

8. An encapsulated multicompartment system as defined in claim 6 wherein the concentration of the acid, component (c) of the resin composition, is between about 0.1 and about 1.0 parts by weight and the concentration of water is not substantially greater than about one part by weight per 100 parts by weight of the total composition.

9. An encapsulated multicompartment system as defined in claim 6 wherein the relatively weak acid, component (c) of the resin composition, is an organic acid.

10. An encapsulated multicompartment system as defined in claim 6 wherein the relatively weak acid, component (c) of the resin composition, is phthalic acid.

* * * * *